(12) United States Patent
Young et al.

(10) Patent No.: US 12,028,373 B2
(45) Date of Patent: Jul. 2, 2024

(54) INFORMATION SECURITY SYSTEM AND METHOD FOR PREVENTING COMMUNICATIONS FROM DETECTED PHISHING DOMAINS

(71) Applicant: Bank of America Corporation, Charlotte, NC (US)

(72) Inventors: Michael Robert Young, Davidson, NC (US); Kelly Renee-Drop Keiter, Waxhaw, NC (US); Richard Martin Seymour Scot, Huntersville, NC (US); Cody Dean Searl, Indian Land, SC (US)

(73) Assignee: Bank of America Corporation, Charlotte, NC (US)

(*) Notice: Subject to any disclaimer, the term of this patent is extended or adjusted under 35 U.S.C. 154(b) by 453 days.

(21) Appl. No.: 17/229,965

(22) Filed: Apr. 14, 2021

(65) Prior Publication Data
US 2022/0337624 A1    Oct. 20, 2022

(51) Int. Cl.
*H04L 9/40*      (2022.01)
*G06F 18/214*    (2023.01)
*H04L 61/4511*   (2022.01)

(52) U.S. Cl.
CPC ........ *H04L 63/1483* (2013.01); *G06F 18/214* (2023.01); *H04L 61/4511* (2022.05);
(Continued)

(58) Field of Classification Search
CPC ............ H04L 63/1483; H04L 61/4511; H04L 61/1511; H04L 61/302; H04L 63/0236;
(Continued)

(56) References Cited

U.S. PATENT DOCUMENTS

| 7,260,639 B2 | 8/2007 | Afergan et al. |
| 7,516,482 B2 | 4/2009 | Wheeler |

(Continued)

OTHER PUBLICATIONS

Young, M. et al., "Information Security System and Method for Phishing Domain Detection," U.S. Appl. No. 17/229,925, filed Apr. 14, 2021, 38 pages.

*Primary Examiner* — Lynn D Feild
*Assistant Examiner* — Saad Ahmad Abdullah

(57) ABSTRACT

A system for preventing communications from detected phishing domains receives a communication associated with a particular domain. The system determines that the particular domain is a phishing domain. In response, in one embodiment, the system registers the particular domain in a Domain Name System (DNS) server to block the communication and future communications associated with the particular domain from being received at computing devices operably coupled with the DNS server. In another embodiment, the system registers the particular domain in the DNS server, such that the communication and future communications associated with the particular domain are re-routed to a particular server to monitor phishing activities implemented on the communications, where the phishing activities comprise attempting to obtain login credentials and private information associated with receivers of the communication and future communications.

20 Claims, 3 Drawing Sheets

(52) U.S. Cl.
CPC ...... *H04L 63/0236* (2013.01); *H04L 63/1416* (2013.01); *H04L 63/1425* (2013.01)

(58) Field of Classification Search
CPC ............ H04L 63/1416; H04L 63/1425; G06K 9/6256
USPC .......................................................... 726/22
See application file for complete search history.

(56) References Cited

U.S. PATENT DOCUMENTS

| | | |
|---|---|---|
| 7,634,809 B1 | 12/2009 | Schneider et al. |
| 7,739,494 B1 | 6/2010 | McCorkendale et al. |
| 7,841,003 B1 | 11/2010 | Emdee |
| 7,930,413 B2 | 4/2011 | Peddemors et al. |
| 7,984,186 B2 | 7/2011 | Perry et al. |
| 7,996,475 B2 | 8/2011 | Drako et al. |
| 8,001,598 B1 | 8/2011 | Sobel et al. |
| 8,020,207 B2 | 9/2011 | Chow et al. |
| 8,087,082 B2 | 12/2011 | Bloch et al. |
| 8,090,940 B1 | 1/2012 | Fenton et al. |
| 8,112,801 B2 | 2/2012 | Abdel-Aziz et al. |
| 8,176,178 B2 | 5/2012 | Thomas et al. |
| 8,185,737 B2 | 5/2012 | Isaacs et al. |
| 8,259,571 B1 | 9/2012 | Raphel et al. |
| 8,380,802 B1 | 2/2013 | King et al. |
| 8,510,793 B2 | 8/2013 | De Lutiis et al. |
| 8,561,187 B1 | 10/2013 | Hegli |
| 8,566,938 B1 | 10/2013 | Prakash et al. |
| 8,589,503 B2 | 11/2013 | Alperovitch et al. |
| 8,649,378 B2 | 2/2014 | Westberg et al. |
| 8,719,352 B2 | 5/2014 | Krasser et al. |
| 8,745,737 B2 | 6/2014 | Thomas et al. |
| 8,752,174 B2 | 6/2014 | Buford et al. |
| 8,869,271 B2 | 10/2014 | Jayaraman et al. |
| 8,887,249 B1 | 11/2014 | Schekochikhin et al. |
| 8,914,886 B2 | 12/2014 | Bishop et al. |
| 8,996,856 B2 | 3/2015 | Amit et al. |
| 9,043,587 B1 | 5/2015 | Chen et al. |
| 9,065,850 B1 | 6/2015 | Sobrier |
| 9,123,027 B2 | 9/2015 | Srivastava et al. |
| 9,258,293 B1 | 2/2016 | Sobel |
| 9,280,911 B2 | 3/2016 | Sadeh-Koniecpol et al. |
| 9,313,123 B2 | 4/2016 | Degaonkar et al. |
| 9,373,267 B2 | 6/2016 | Sadeh-Koniecpol et al. |
| 9,398,029 B2 | 7/2016 | Sadeh-Koniecpol et al. |
| 9,525,602 B2 | 12/2016 | Martini |
| 9,547,998 B2 | 1/2017 | Sadeh-Koniecpol et al. |
| 9,558,677 B2 | 1/2017 | Sadeh-Koniecpol et al. |
| 9,606,893 B2 | 3/2017 | Gupta et al. |
| 9,628,498 B1 | 4/2017 | Aziz et al. |
| 9,654,494 B2 | 5/2017 | Hentunen |
| 9,680,842 B2 | 6/2017 | Thomas et al. |
| 9,712,559 B2 | 7/2017 | Gospodarek et al. |
| 9,740,858 B1 | 8/2017 | Wu et al. |
| 9,813,454 B2 | 11/2017 | Sadeh-Koniecpol et al. |
| 9,870,715 B2 | 1/2018 | Sadeh-Koniecpol et al. |
| 9,923,961 B2 | 3/2018 | Hentunen |
| 9,979,748 B2 * | 5/2018 | O'Connor ............. H04L 63/145 |
| 11,671,448 B2 * | 6/2023 | Nunes .................... G06F 3/044 |
| | | 726/1 |
| 2016/0180735 A1 | 6/2016 | Clark et al. |
| 2018/0063190 A1 * | 3/2018 | Wright ................ H04L 63/1425 |
| 2020/0349430 A1 * | 11/2020 | Schmidtler ............ G06N 3/084 |

\* cited by examiner

INFORMATION SECURITY SYSTEM AND METHOD FOR PREVENTING COMMUNICATIONS FROM DETECTED PHISHING DOMAINS

TECHNICAL FIELD

The present disclosure relates generally to information security, and more specifically to an information security system and method for preventing communications from detected phishing domains.

BACKGROUND

As communications using electronic mails ("emails") and text messages continue to be utilized by an ever-increasing number of users, so does fraudulent and criminal activity via such communications. It is challenging to determine whether an email or a text message is legitimate or associated with a fraudulent or phishing attack. Phishing attacks are becoming more prevalent and are a growing concern that can take different forms. For example, a "phisher" can use a phishing domain that is similar to a domain name of a well-known and/or trusted website, and send a deceptive email/text message to one or more unsuspecting users in an attempt to elicit the users to respond with personal information that can be used for at users' expense.

SUMMARY

Current phishing detection technologies are not configured to provide a reliable and efficient solution for phishing domain detection. This disclosure contemplates systems and methods for detecting phishing domains. This disclosure further contemplates systems and methods for preventing communications from the detected phishing domains.

With respect to phishing domain detection, the disclosed system is configured to determine whether a communication is associated with a phishing domain. To this end, the disclosed system receives the communication associated with a domain, where the communication may be a text message, an email message, a posted message on a social media platform, or any other form of communication.

The disclosed system extracts a first set of features from the communication by feeding the message to a machine learning algorithm. The output of this operation is a vector that comprises numerical values representing the first set of features. The first set of features may include a time of receipt, a calendar date of receipt, a sender name, a domain name, a sentiment message (e.g., sense of urgency), a length of the content, an attachment file, size (e.g., in bytes), Internet Protocol (IP) address, and an operating system of a sending device associated with the communication.

The disclosed system compares the first set of features with a training dataset that comprises previously extracted features associated with historical communications labeled with or known to be associated with phishing domains. For example, the disclosed system compares the first set of features with a second set of features associated with a historical communication that is labeled with a phishing domain. If the disclosed system determines that the first set of features corresponds to the second set of features, the disclosed system determines that the domain associated with the communication is the phishing domain.

In one embodiment, the disclosed system may be configured to proactively detect potential phishing domains that may be used for impersonating a target domain (also interchangeably referred to herein as the phishing target domain).

To this end, the disclosed system executes a query against domain name website registrar's databases available on the Internet to search for domain names that follow a domain name/style pattern of the target domain, and are not registered by a third party. For example, a user may specify in the query to search for domain names that may include the name of the target domain with one or more digits, alphabet letters, and/or symbols. For example, assuming that the phishing target domain ends with ".com," the query may return domains that follow the name pattern of the phishing target domain ending with ".org," ".biz," ".online," etc. The disclosed system may then register and monitor these domains to prevent them from being used as phishing domains.

With respect to preventing communications from detected phishing domains, the disclosed system can prevent receipt of communications from the detected phishing domains by various methods, as described below.

In one embodiment, the disclosed system may implement a firewall configuration that indicates communications associated with a phishing domain should be blocked from being received at internal computing devices monitored by a Domain Name System (DNS) server associated with an organization. For example, the disclosed system may register the phishing domain in the DNS server to block communications associated with the phishing domain.

In another embodiment, the disclosed system may register the phishing domain in an external domain registration system, such that communications associated with the phishing domain are blocked from being received at external computing devices with respect to the organization.

In another embodiment, the disclosed system may register communications associated with the phishing domain to re-route those communications to a particular server to monitor phishing activities implemented in those communications, where the phishing activities may include attempting to obtain unauthorized access to confidential information, login credentials, etc. associated with receivers of those communications.

With respect to phishing domain detection, in one embodiment, a system comprises a processor and a memory. The memory is operable to store a training dataset comprising a plurality of received communications. At least one training communication from the plurality of received communications comprises a text message or an email message and is known to be associated with a particular phishing domain. The at least one training communication is associated with a first set of features comprising at least two of a first time of receipt, a first sender name, a first domain name, a first message sentiment, and a first attachment file associated with the at least one training communication. The processor is operably coupled with the memory. The processor receives a live communication comprising a text message or an email message and that is associated with a particular domain. The processor extracts a second set of features from the live communication, where the second set of features comprises at least two of a second time of receipt, a second sender name, a second domain name, a second message sentiment, and a second attachment file associated with the live communication. For at least one feature from the second set of features, the processor compares the feature with a counterpart feature from the first set of features. The processor determines whether the feature corresponds with the counterpart feature. The processor determines whether more than a threshold percentage of features from the second set of features corresponds with counterpart features from the first set of features. In response to determining that more than the threshold percentage of features from the second set of features corresponds with the counterpart features from the first set of features, the processor determines that the particular domain associated with the live communication is the particular phishing domain.

With respect to preventing communications associates with phishing domains, in one embodiment, a system comprises a processor and a memory. The processor receives a first set of communications comprising at least one of a text message and an email message, where the first set of communications is associated with a first domain. The processor determines that the first domain is a first phishing domain. In response to determining that the first domain is the first phishing domain, the processor registers the first phishing domain in a Domain Name System (DNS) server associated with the processor, such that the first set of communications is blocked by a firewall configuration to be received at computing devices operably coupled with the processor. The processor receives a second set of communications comprising at least one of a text message and an email message, where the second set of communications is associated with a second domain. The processor determines that the second domain is a second phishing domain. In response to determining that the second domain is the second phishing domain, the processor registers the second phishing domain in the DNS server to re-route the second set of communications to a particular server to monitor the second set of communications to determine phishing activities implemented in the second set of communications over time, where the phishing activities comprise attempting to obtain login credentials associated with receivers of the second set of communications. The processor forwards the second set of communications for investigation.

The disclosed system provides several practical applications and technical advantages which include: 1) technology that determines whether a domain associated with a communication is a phishing domain, based on extracting features from the communication and comparing the extracted features with features associated with historical communications labeled with phishing domains; 2) technology that proactively identifies domains that may potentially be used as phishing domains to impersonate a target domain in the future, by executing a query that includes statements that specify variations and modifications to the name of the target domain, and statements that specify to return domains that do not have an ownership, i.e., are not registered; 3) technology that prevents communications associated with a phishing domain by registering the phishing domain in a DNS server, e.g., by implementing a firewall configuration in the DNS server; and 4) technology that registers the phishing domain in the DNS server to re-route communications associated with the phishing domain to a particular server to monitor phishing activities implemented in the communications, and forward them for investigation, e.g., to authorizes, law enforcement, etc.

As such, the disclosed system may improve phishing domain detection technologies by implementing 1) systems and methods for proactively detecting domains that may potentially be used as phishing domains in the future; and 2) systems and methods for detecting phishing domains and preventing communications associated with the detected phishing domains.

Accordingly, the disclosed system may be integrated into a practical application of securing comparing devices that would otherwise receive communications associated with phishing domains with the current phishing domain detection technologies. For example, by proactively detecting potential phishing domains and preventing communications associated with phishing domains, the receiving computing devices are kept secured from unauthorized access, and thus, from data extraction, exfiltration, modification, destruction, etc.

This, in turn, provides an additional practical application of improving underlying operations of the receiving computing devices. For example, malware that may be attached to a communication associated with a phishing domain is blocked by a firewall configuration. In another example, the disclosed system may reduce processing, memory, and time resources for phishing domain detection that would otherwise be spent using the current phishing domain detection technologies.

The disclosed system may further be integrated into an additional practical application of securing confidential information (e.g., login credentials, etc.) associated with receivers of communications from phishing domains.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient, reliable, and safe solutions for phishing domain detection. This disclosure provides various systems and methods for phishing domain detection, and preventing communications associated with phishing domains. In one embodiment, system 100 and method 200 for phishing domain detection are described in FIGS. 1 and 2, respectively. In one embodiment, system 100 and method 300 for preventing communications associated with phishing domains are described in FIGS. 1 and 3, respectively.

Figure 1:
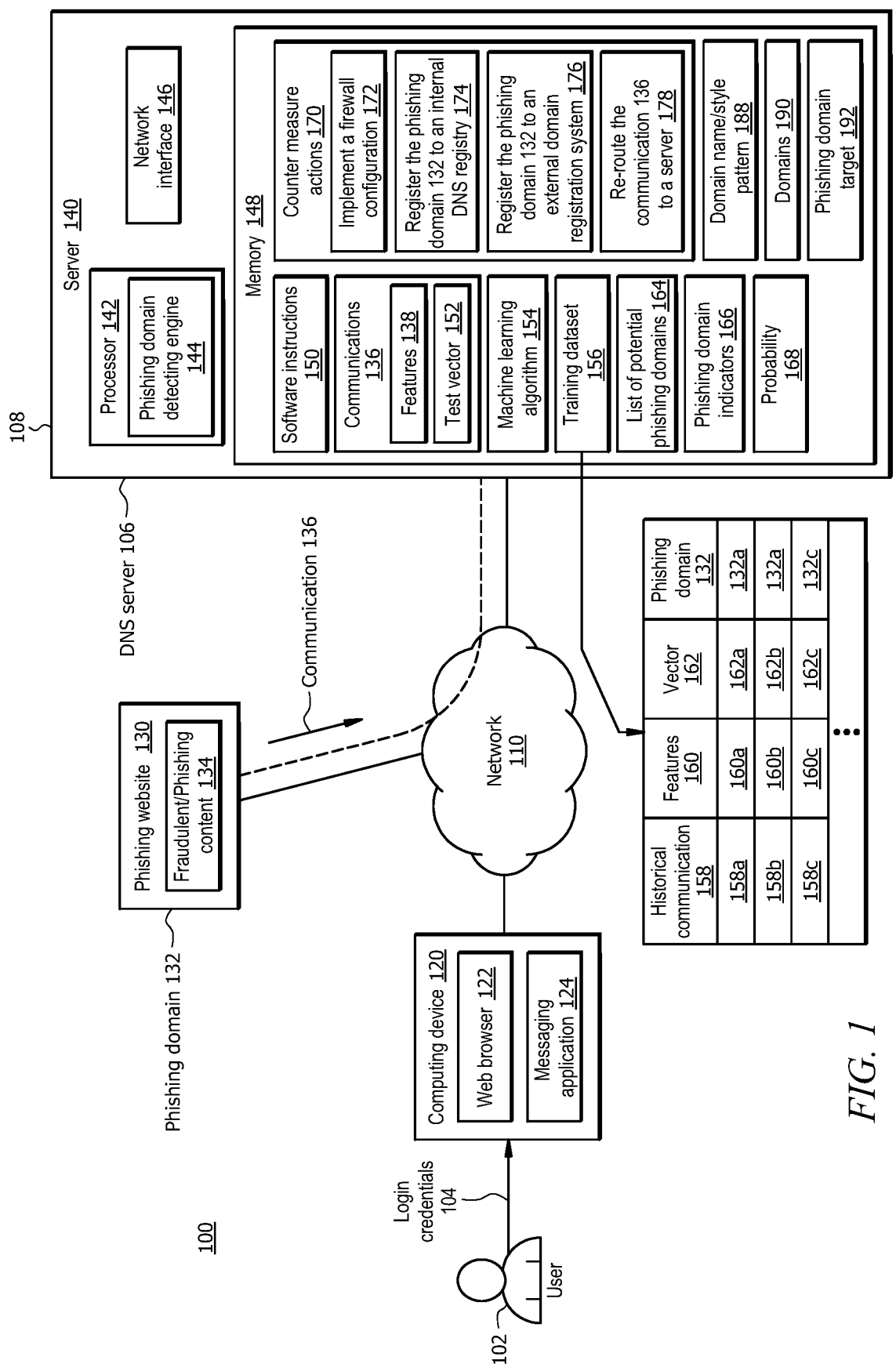
FIG. 1 illustrates an embodiment of a system configured to detect phishing domains and prevent communications associated with phishing domains.

Example System for Phishing Domain Detection and Preventing Communications Associated with Phishing Domains FIG. 1 illustrates one embodiment of a system 100 that is configured to detect phishing domains 132, and prevent communications 136 associated with phishing domains 132. In one embodiment, system 100 comprises a server 140. In some embodiments, system 100 further comprises a network 110, a computing device 120, and a phishing website 130. Network 110 enables communications between components of the system 100. Server 140 comprises a processor 142 in signal communication with a memory 148. Memory 148 stores software instructions 150 that when executed by the processor 142 cause the processor 142 to perform one or more functions described herein. For example, when the software instructions 150 are executed, the processor 142 executes a phishing domain detecting engine 144 to determine whether a communication 136 is associated with a phishing domain 132. In other embodiments, system 100 may not have all of the components listed and/or may have other elements instead of, or in addition to, those listed above.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing device 120 is generally any device that is configured to process data and interact with users 102. Examples of computing device 120 include, but are not limited to, a personal computer, a desktop computer, a workstation, a server, a laptop, a tablet computer, a mobile phone (such as a smartphone), etc. The user 102 may send and receive communications (e.g., communication 136) via the computing device 120, such as emails, text messages, popup notifications, and the like. For example, the user 102 may receive a communication 136 that is associated with a phishing domain 132. The communication 136 may be crafted to gain unauthorized access to login credentials 104, personal information, and/or confidential information associated with the user 102. The user 102 may access and view the communication 136 from a massaging application 124. The communication 136 may include a selectable link to the phishing website 130. By accessing the selectable link, the phishing website 130 may be viewed on the web browser 122.

Phishing website 130 is generally any phishing source that hosts fraudulent/phishing content 134. Once the user 102 accesses the phishing website 130, the user 102 may be elicited to provide login credentials 104, personal information, confidential information, and/or financial account information (also collectively referred to herein as "private information"). The private information obtained from the user 102 may be used for monetary gain at the expense of the user 102. The phishing website 130 is associated with a phishing domain 132. The phishing domain 132 may be crafted to impersonate a phishing target domain 192 (also referred to herein as phishing target 192). The phishing domain 132 may be parity of the phishing target 192. For example, the name of the phishing domain 132 may be crafted by bad actors/hackers to impersonate the phishing target 192 by including modifications to the phishing target 192, such as adding one or more digits, letters, and/or symbols. In another example, the name of the phishing domain 132 may be crafted such that one or more digits, letters, and/or symbols are replaced with one or more existing characters in the phishing target 192 that the phishing domain 132 is attempting to impersonate.

Server

Server 140 is generally a server or any other device configured to process data and communicate with computing devices (e.g., computing device 120, computing devices that are hosting the phishing websites 130), databases, etc. via the network 110. In one example, the server 140 may be a Domain Name System (DNS) server 140 associated with an organization 108. The server 140 is generally configured to oversee operations of the phishing domain detecting engine 144, as described further below in conjunction with an operational flow of system 100.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the phishing domain detecting engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more steps of methods 200 and 300 as described in FIGS. 2 and 3, respectively.

Network interface 146 is configured to enable wired and/or wireless communications (e.g., via network 110). The network interface 146 is configured to communicate data between the server 140 and other devices (e.g., computing device 120, computing devices that are hosting the phishing websites 130), databases, systems, or domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the communication 136, software instructions 150, machine learning algorithm 154, training dataset 156, phishing domain indicators 166, list of potential phishing domains 164, probabilities 168, countermeasure actions 170, domain name/style pattern 188, domains 190, phishing targets 192, and/or any other data or instructions. The software instructions 150 may comprise any suitable set of instructions, logic, rules, or code operable to execute the processor 142.

Phishing Domain Detecting Engine and its Operations

Phishing domain detecting engine 144 may be implemented by the processor 142 executing software instructions 150, and is generally configured to determine whether a live communication 136 (also interchangeably referred to herein as communication 136) is associated with a phishing domain 132. The phishing domain detecting engine 144 may further be configured to execute a countermeasure action 170 to prevent communications 136 associated with phishing domains 132. The phishing domain detecting engine 144 may further be configured to predict a domain name/style pattern 188 that may be used (e.g., by bad actors) as a future phishing domain 132, execute a query to find domains 190 that follow the predicted domain name/style pattern 188, and register those domains 190. In this manner, bad actors would not be able to register and use those domains 190 as phishing domains 132. Operations of the phishing domain detecting engine 144 are described further below in conjunction with the operational flow of the system 100, method 200 described in FIG. 2, and method 300 described in FIG. 3.

In one embodiment, the phishing domain detecting engine 144 may be implemented by a machine learning algorithm 154, such as, a support vector machine, a neural network, a random forest, a k-means clustering, etc. For example, the phishing domain detecting engine 144 may be implemented by a plurality of neural network (NN) layers, Convolutional NN (CNN) layers, Long-Short-Term-Memory (LSTM) layers, Bi-directional LSTM layers, Recurrent NN (RNN) layers, and the like. In another example, the machine learning algorithm 154 may be implemented by a Natural Language Processing (NLP) algorithm.

The machine learning algorithm 154 may be trained, tested, and refined by the training dataset 156. The training dataset 156 may include historical (or training) communications 158 each is known to be associated with a phishing domain 132. The historical communications 158 may include text messages, email messages, a posted message on a social media platform, a popup notification, and the like. For example, by implementing a supervised model, an operator or a developer may determine that a historical communication 158a is associated with a phishing domain 132a, label the historical communication 158a with the phishing domain 132a, and add the historical communication 158a labeled with the phishing domain 132a to the training dataset 156. The phishing domain detecting engine 144 uses the training dataset 156 to improve the accuracy of phishing domain detection, as described below.

The phishing domain detecting engine 144 feeds the historical communication 158 to the machine learning algorithm 154 to extract features 160 from the historical communication 158. The output of this operation is a vector 162 that comprises numerical values representing the features 160. The features 160 may include a time of receipt, a calendar date of receipt, a name of a sender, a name of a domain, a sentiment/tone of the content/message (e.g., sense of urgency), a length of the content, an attachment file, size (e.g., in bytes), Internet Protocol (IP) address, an operating system of a sending device associated with the historical communication 158, and/or any other information that can be extracted from the historical communication 158. For example, a first numerical value in the vector 162 may represent the time of receipt of the historical communication 158, a second numerical value in the vector 162 may represent the calendar date of the receipt of the historical communication 158, a third numerical value in the vector 162 may represent the name of the sender of the historical communication 158, and so on.

In one embodiment, the phishing domain detecting engine 144 may execute the machine learning algorithm 154 that includes an NLP to extract the features 160. In this operation, the phishing domain detecting engine 144 may use any type of text analysis, such as word segmentation, sentence segmentation, word tokenization, sentence tokenization, and/or the like. The phishing domain detecting engine 144 may learn the associations, correlations, and patterns between the features 160 that resulted in the historical communication 158 being associated with the phishing domain 132 as indicated by the operator or developer. Such associations, correlations, and patterns between the features 160 may be referred to as phishing domain indicators 166, which is described further below.

In a testing process, for example, the phishing domain detecting engine 144 is fed a historical communication 158b that is not labeled with a phishing domain 132, and is asked to determine whether the unlabeled historical communication 158b is associated with a phishing domain 132 or not. The phishing domain detecting engine 144 feeds the historical communication 158b to the machine learning algorithm 154 to extract features 160b from the historical communication 158b, where the features 160b are represented by a vector 162b.

The phishing domain detecting engine 144 compares each numerical value from the vector 162b with a counterpart numerical value from the vector 162a to determine whether more than a threshold percentage of the numerical values of the vector 162b (e.g., above 80%, 85%, etc.) are within a threshold range (e.g., ±5%, ±10%, etc.) of the counterpart numerical values of the vector 162a. If it is determined that more than the threshold percentage of the numerical values of the vector 162b are within the threshold range of the counterpart numerical values of the vector 162a, the phishing domain detecting engine 144 determines that the historical communication 158b is associated with the phishing domain 132a.

In this manner, the phishing domain detecting engine 144 may perform a classification among historical communications 158 based on a particular class of phishing domain 132 that they belong to. For example, the phishing domain detecting engine 144 may classify the historical communications 158a,b in the class of phishing domain 132a, historical communication 158c in the class of phishing domain 132b, and so on.

The classification determined by the phishing domain detecting engine 144 may be refined by receiving feedback from the operator indicating whether the classification of the phishing domain detecting engine 144 is correct or not. Once the phishing domain detecting engine 144 is trained, tested, and refined, the phishing domain detecting engine 144 may be used to determine whether any of incoming (or live) communications 136 are associated with a phishing domain 132. This process is described below in conjunction with the operational flow of the system 100.

Operational Flow

Determining Whether a Communication is Associated with a Phishing Domain

In one embodiment, the operational flow of system 100 begins when the server 140 receives a live communication 136, such as a text message, an email message, a posted message on a social media platform, a popup notification from the phishing website 130, etc. In one example, since the server 140 may be a DNS server 106 that monitors communication from and to the computing devices 120 associated with the organization 108, the server 140 may intercept the communication 136 that is routed to or intended to be received by the computing device 120 before the communication 136 arrives at the computing device 120. In another example, the server 140 may receive the communication 136 from the computing device 120 when the communication 136 is forwarded from the computing device 120, e.g., by the user 102.

Upon receiving the communication 136, the phishing domain detecting engine 144 feeds the communication 136 to the machine learning algorithm 154 to extract features 138 from the communication 136. For example, the phishing domain detecting engine 144 may use a text processing algorithm, such as NLP to extract the features 138, similar to that described above with respect to extracting features 160. The features 138 may include a time of receipt, a calendar date of receipt, a name of a sender, a name of a domain, a sentiment/tone of the content/message (e.g., sense of urgency), a length of the content, an attachment file, size (e.g., in bytes), Internet Protocol (IP) address, and an operating system of a sending device associated with the communication 136, and/or any other information that can be extracted from the communication 136.

The phishing domain detecting engine 144 may determine whether any of the features 138 is associated with or represent a phishing domain indicator 166. The phishing domain indicators 166 may generally include any indicator that may result in suspecting the communication 136 is associated with a phishing domain 132.

For example, a first phishing domain indicator 166 may indicate that the time of receipt of the communication 136 correspond to (or within a threshold interval) of the time of receipt of other communications 136 labeled with the phishing domain 132. In this example, the first phishing domain indicator 166 may further indicate that the time of receipt of the communication 136 does not correspond to (or within a threshold interval) of operation hours of the phishing target 192 that the phishing domain 132 is attempting to impersonate. For example, assume that the operation hours of the phishing target 192 follow a specific time zone (e.g., Central Time). Also, assume that the time of receipt of the communication 136 is out of the operation hours of the phishing target 192 according to the specific time zone (e.g., during a public holiday or midnight). In this particular example, the phishing domain detecting engine 144 compares the time of receipt of the communication 136 with the operation hours of the phishing target 192 that the phishing domain 132 is attempting to impersonate. Based on this comparison, the phishing domain detecting engine 144 determines the first phishing domain indicator 166 indicating the time of receipt of the communication 136 does not correspond to the operation hours of the phishing target 192 that the phishing domain 132 is attempting to impersonate.

In another example, a second phishing domain indicator 166 may indicate that a calendar date of the communication 136 corresponds to (or within a threshold interval) of working days of the phishing target 192 that the phishing domain 132 is attempting to impersonate.

In another example, one or more phishing domain indicators 166 may indicate that the name of the sender of the communication 136 and/or the name of the domain associated with the communication 136 includes modifications and/or substitutions, such as adding, removing, and/or substituting one or more digits, letters, and/or symbols compared to the name of the phishing target 192.

In another example, a third phishing domain indicator 166 may indicate that the sentiment message of the communication 136 is associated with a sense of urgency. For example, the phishing domain detecting engine 144, using the NLP algorithm, may determine the sentiment or tone of the content of the communication 136, and determine whether the sentiment message of the communication 136 is associated with a sense of urgency. In another example, the phishing domain detecting engine 144, using the NLP algorithm, may determine whether the sentiment of the content of the communication 136 is positive, negative, or neutral. In another example, the phishing domain detecting engine 144 may determine whether the content of the communication 136 includes requesting to access a selectable hyperlink included in the content by a deadline, etc.

In another example, a fourth phishing domain indicator 166 may indicate that there is an executable (or compressed) attachment file (e.g., malware) with a particular name and size is associated with the communication 136.

In another example, a fifth phishing domain indicator 166 may indicate that the IP address associated with the communication does not belong to a region (e.g., country) from where the communication 136 is originated.

In another example, a sixth phishing domain indicator 166 may indicate that the incoming and/or outgoing network traffic of the domain associated with the communication 136 is below a threshold percentage (e.g., below 1% per day). For example, the phishing domain detecting engine 144 may determine the incoming and/or outgoing network traffic of the domain associated with the communication 136 by searching for the name of the domain associated with the communication 136 in the network traffic monitoring websites on the Internet.

In this manner, the phishing domain detecting engine 144 may detect one or more phishing domain indicators 166 from the features 160.

The features 138 may be represented by a vector 152 that comprises numerical values. For example, a first numerical value of the vector 152 may represent the time of receipt of the communication 136, a second numerical value of the vector 152 may represent the calendar date of receipt of the communication 136, a third numerical value of the vector 152 may represent the name of the sender of the communication 136, and so on.

The phishing domain detecting engine 144 compares the features 138 with features 160 that are labeled with phishing domains 132. In this operation, the phishing domain detecting engine 144 may perform a vector comparison or a dot-product between the vector 152 and each of the vectors 162 associated with historical communications 158 and phishing domains 132. For example, with respect to the historical communication 158a, the phishing domain detecting engine 144 may compare each numerical value of the vector 152 with a corresponding/counterpart numerical value of the vector 162a. The phishing domain detecting engine 144 determines whether the features 138 correspond to any of the features 160. For example, the phishing domain detecting engine 144 may determine the features 138 correspond to the features 160, if more than the threshold percentage (e.g., 80%, 85%, etc.) of the numerical values of the vector 152 are within the threshold range (e.g., ±5%, ±10%, etc.) of the numerical values of the vector 162a. In another example, the phishing domain detecting engine 144 may determine whether each feature 138 matches its counterpart feature 160, if more than the threshold range of the numerical values of the vector 152 match their counterpart numerical values of the vector 162a.

In this manner, the phishing domain detecting engine 144 may determine a probability 168 of the domain associated with the communication 136 being a phishing domain 132a.

For example, the probability 168 of the domain associated with the communication 136 being the phishing domain 132*a* corresponds to the percentage of numerical values of the vector 152 that corresponds to their counterpart numerical values of the vector 162*a*.

The phishing domain detecting engine 144 may perform a similar operation to determine probabilities of other communications 136. The phishing domain detecting engine 144 may then rank domains of communications 136 based on their determined probabilities 168, and store them in the list of potential phishing domains 164.

The phishing domain detecting engine 144 may execute a countermeasure action 170, e.g., to block incoming communications 136 associated with potential phishing domains 164 that have a probability 168 more than a threshold percentage. This process is described in more detail further below.

In response to determining that the features 138 correspond to the features 160*a*, the phishing domain detecting engine 144 determines that the communication 136 is associated with the phishing domain 132*a*. The phishing domain detecting engine 144 may add the communication 136 to the training dataset 156 in the class of phishing domain 132*a*.

The phishing domain detecting engine 144 may further be configured to proactively identify or predict potential domains 190 that may be used as phishing domains 132 by bad actors to impersonate a phishing target 192. In this process, the phishing domain detecting engine 144 may receive a request to identify or predict potential domains 190 that may be used as phishing domains 132 to impersonate a phishing target 192. The phishing target 192 may be any domain. For example, the phishing target 192 may be a domain that is targeted for malicious activities, including phishing attacks, injecting malware, etc. in an attempt to gain unauthorized access to confidential information associated with the phishing target 192.

The phishing domain detecting engine 144 may execute a query against databases of domain name registrars that are available on the Internet to search for potential domains 190 that follow a particular domain name/style pattern 188 corresponding to the phishing target 192 and are not registered. The particular domain name/style pattern 188 may correspond to variations and modifications with respect to the phishing target 192. For example, assuming that the phishing target 192 ends with ".com," the particular domain name/style 188 may include the name of the phishing target 192 (and/or the name of the phishing target 192 modified by one or more digits, letters, and/or symbols) ending with ".org," ".biz," ".online," etc. For example, an operator or a developer may specify a conditional statement in the query that specifies to return domains 190 that follow such particular domain name/style pattern 188 and are not registered.

Upon executing the query, the result of the query may include potential domains 190 that follow a particular domain name/style pattern 188, and do not have ownership, i.e., are not registered. These potential domain 190 may be registered and monitored by the operator or dedicated personnel at the organization 108. In this manner, the phishing domain detecting engine 144 may proactively detect potential domains 190 that may potentially be used to impersonate phishing target domains 192.

Preventing Communications from the Detected Phishing Domain

Upon determining that the communication 136 is associated with the phishing domain 132, the phishing domain detecting engine 144 may execute a countermeasure action 170.

For example, the countermeasure action 170 may include implementing a firewall configuration 172 that indicates the communication 136 and further communications 136 associated with the phishing domain 132 are blocked to be received by computing devices 120 operably coupled with the server 140.

In another example, the countermeasure action 170 may include registering the phishing domain 132 to an internal DNS registry 174 that is associated with the server 140. As such, internal computing devices 120 associated with the organization 108 are kept secured from phishing attacks via future communications 136 associated with the phishing domain 132.

In another example, the countermeasure action 170 may include registering the phishing domain 132 to an external domain registration system 176, such that external computing devices 120 with respect to the organization 108 are kept secured from phishing attacks via future communications 136 associated with the phishing domain 132.

In another example, the countermeasure action 170 may include re-routing the communication 136 and future communications 136 associated with the phishing domain 132 to a particular server 178. For example, the countermeasure action 170 may include registering the phishing domain 132 in the DNS server 140 to re-route the communication 136 and future communications 136 to the particular server 178. The phishing domain detecting engine 144 re-routes the communication 136 and future communications 136 to the particular server 178 to monitor the communication 136 and future communications 136 to determine their phishing activities and strategies, including attempting to obtain private information, login credentials 104 associated with their receivers. The phishing domain detecting engine 144 may further forward the communication 136 and future communications 136 to authorities (e.g., law enforcement) for investigation.

Example Method for Phishing Domain Detection

Figure 2:
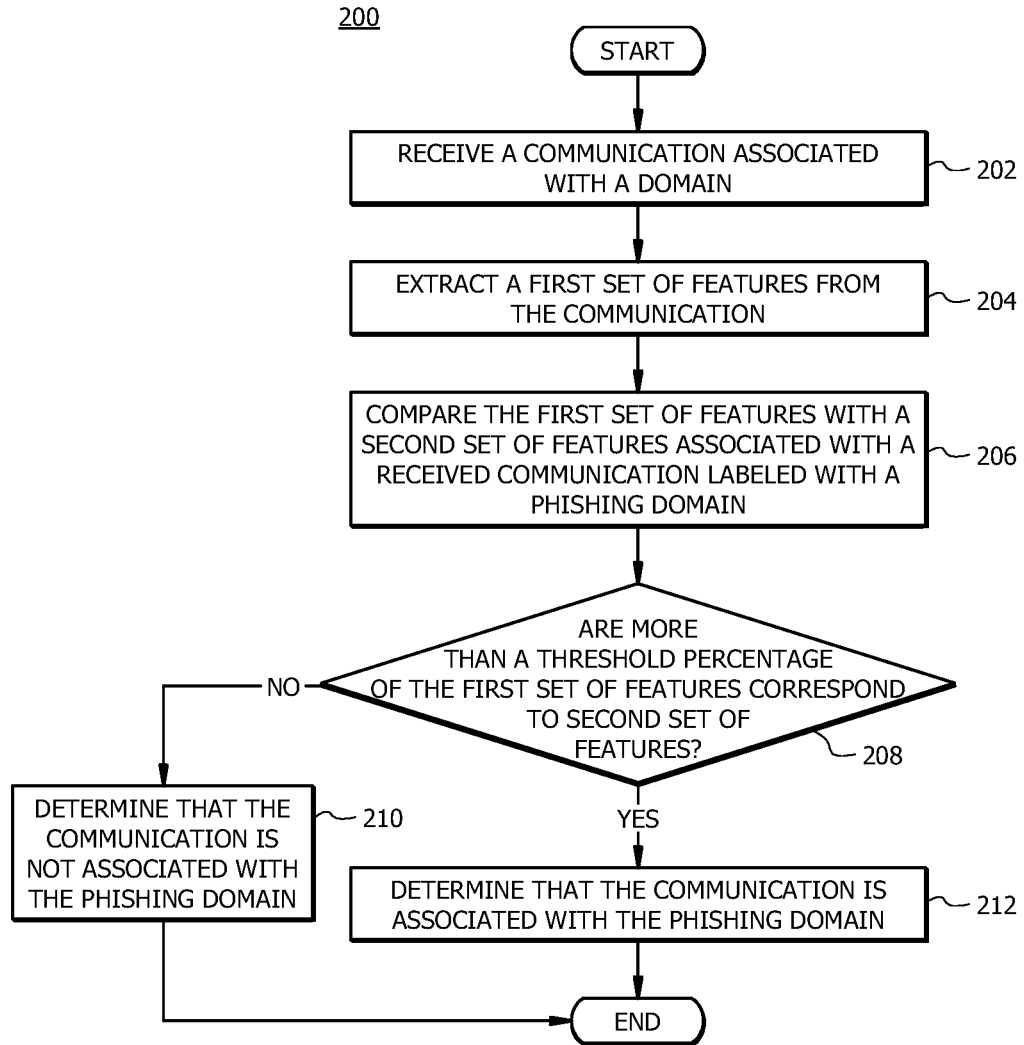
FIG. 2 illustrates an example flowchart of a method for phishing domain detection.

FIG. 2 illustrates an example flowchart of a method 200 for detecting phishing domains 132. Modifications, additions, or omissions may be made to method 200. Method 200 may include more, fewer, or other steps. For example, steps may be performed in parallel or in any suitable order. While at times discussed as the system 100, processor 142, phishing domain detecting engine 144, or components of any of thereof performing steps, any suitable system or components of the system may perform one or more steps of the method 200. For example, one or more steps of method 200 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 202-212.

Method 200 begins at step 202 where the phishing domain detecting engine 144 receives a communication 136 associated with a domain. The communication 136 may be a text message, an email message, a post message on a social media platform, a popup notification from the phishing website 130, etc. For example, the phishing domain detecting engine 144 may receive the communication 136 when the server 140 intercepts the communication 136 that is intended to be received by the computing device 120. In another example, the phishing domain detecting engine 144 may receive the communication 136 when the communication 136 is forwarded from the computing device 120 to the server 140, e.g., by the user 102.

At step 204, the phishing domain detecting engine 144 extracts a first set of features 138 from the communication 136. For example, the phishing domain detecting engine 144 may extract the set of features 138 from the communication 136 by feeding the communication 136 to the machine learning algorithm 154, similar to that described in FIG. 1. The output of this operation is the vector 152 that comprises numerical values representing the set of features 138.

At step 206, the phishing domain detecting engine 144 compares the first set of features 138 with a second set of features 160 associated with a received/historical communication 158 labeled with a phishing domain 132. In this process, the phishing domain detecting engine 144 may compare the first set of features 138 with the second set of features 160 associated with each received/historical communication 158 stored in the training dataset 156. For example, the phishing domain detecting engine 144 may compare the vector 152 with each vector 162, including vectors 162*a,b*, and *c*, similar to that described in FIG. 1.

At step 208, the phishing domain detecting engine 144 determines whether more than a threshold percentage of the first set of features 138 corresponds to the second set of features 160.

In this process, the phishing domain detecting engine 144 determines whether more than the threshold percentage (e.g., above 85%, 90%, etc.) of numerical values of the vector 152 match, correspond to, or are within a threshold range (e.g., ±5%, ±10%, etc.) of numerical values of the vector 162, similar to that described in FIG. 1. If it is determined that more than the threshold percentage of the first set of features 138 corresponds to the second set of features 160, method 200 proceeds to step 212. Otherwise, method 200 proceeds to step 210.

At step 210, the phishing domain detecting engine 144 determines that the communication 136 is not associated with the phishing domain 132.

At step 212, the phishing domain detecting engine 144 determines that the communication 136 is associated with the phishing domain 132. In other words, the phishing domain detecting engine 144 determines that the domain associated with the communication 136 is the phishing domain 132.

Example Method for Preventing Communications from Detected Phishing Domains

Figure 3:
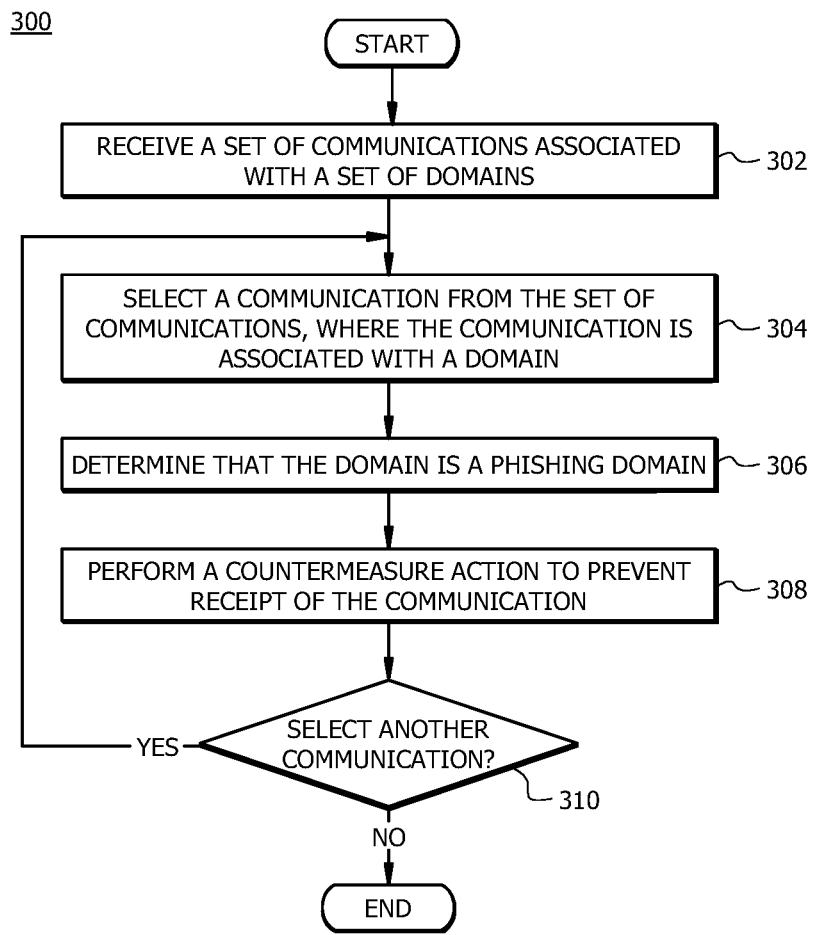
FIG. 3 illustrates an example flowchart of a method for preventing communications associated with phishing domains.

FIG. 3 illustrates an example flowchart of a method 300 for detecting phishing domains 132. Modifications, additions, or omissions may be made to method 300. Method 300 may include more, fewer, or other steps. For example, steps may be performed in parallel or in any suitable order. While at times discussed as the system 100, processor 142, phishing domain detecting engine 144, or components of any of thereof performing steps, any suitable system or components of the system may perform one or more steps of the method 300. For example, one or more steps of method 300 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 302-310.

Method 300 begins at step 302 where the phishing domain detecting engine 144 receives a set of communications 136 associated with a set of domains, similar to that described in step 202 of method 200 described in FIG. 2.

At step 304, the phishing domain detecting engine 144 selects a communication 136 from the set of communications 136, where the communication 136 is associated with a domain. The phishing domain detecting engine 144 iteratively selects a communication 136 from the set of communications 136 until no communication 136 is left for evaluation.

At step 306, the phishing domain detecting engine 144 determines that the domain is a phishing domain 132. The phishing domain detecting engine 144 may determine that the domain is a phishing domain 132 by feeding the communication 136 to the machine learning algorithm 154, extracting features 138, comparing the features 138 with features 160, and determining whether the features 138 correspond to features 160, similar to those described in FIG. 1 and steps 204-210 of method 200 described in FIG. 2.

At step 308, the phishing domain detecting engine 144 performs a countermeasure action 170 to prevent receipt of the communication 136. For example, the phishing domain detecting engine 144 may implement a firewall configuration 172 that indicates the communication 136 and further communications 136 associated with the phishing domain 132 should be blocked to be received by computing devices 120 operably coupled with the server 140 (and the processor 142). In another example, the phishing domain detecting engine 144 may register the phishing domain 132 in an internal DNS registry 174 that is associated with the server 140, similar to that described above in FIG. 1. In another example, the phishing domain detecting engine 144 may register the phishing domain 132 in an external domain registration system 176, similar to that described above in FIG. 1. In another example, the phishing domain detecting engine 144 may re-route the communication 136 and future communications 136 to a particular server to monitor the communication 136 and future communications 136 to determine their phishing activities and strategies, including attempting to obtain private information, login credentials 104 associated with their receivers, and forward the communication 136 and future communications 136 to authorities (e.g., law enforcement) for investigation.

At step 310, the phishing domain detecting engine 144 determines whether to select another communication 136. The phishing domain detecting engine 144 selects another communication 136 if the phishing domain detecting engine 144 determines that at least one communication 136 is left for evaluation. If the phishing domain detecting engine 144 determines that at least one communication 136 is left for evaluation, method 300 returns to step 304. Otherwise, method 300 terminates.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for preventing communications from phishing domains, comprising:
a processor configured to:
receive a first set of communications comprising at least one email message, wherein the first set of communications is associated with a first domain;
determine that the first domain is a first phishing domain, wherein the first phishing domain corresponds to a first variation of a phishing domain target;
in response to determining that the first domain is the first phishing domain, register the first phishing domain in a Domain Name System (DNS) server associated with the processor, such that the first set of communications is blocked by a firewall configuration to be received at computing devices operably coupled with the processor;
predict a domain style pattern that corresponds to at least one variation of the phishing domain target;
in response to predicting the domain style pattern that corresponds to at least one variation of the phishing domain target, execute a query to identify a second domain that follows the predicted domain style pattern and is not registered as a phishing domain;
receive a second set of communications comprising at least one email message, wherein the second set of communications is associated with the second domain;
determine a phishing domain indicator associated with the second domain, wherein the phishing domain indicator comprises a calendar date associated with the second set of communications being within a threshold interval of an operating period associated with the phishing domain target;
determine that the second domain is a second phishing domain based at least in part upon the phishing domain indicator; and
in response to determining that the second domain is the second phishing domain:
register the second phishing domain in the DNS server to re-route the second set of communications to a particular server to monitor the second set of communications to determine phishing activities implemented in the second set of communications over time, wherein the phishing activities comprise attempting to obtain login credentials associated with receivers of the second set of communications; and
forward the second set of communications for investigation; and
a memory, operably coupled with the processor, and operable to store the first set of communications and the second set of communications.

2. The system of claim 1, wherein:
the memory is further operable to store a training dataset comprising a plurality of received communications;
at least one training communication from the plurality of received communications comprises a text message or an email message and is known to be associated with a particular phishing domain; and
the at least one training communication is associated with a first set of features comprising at least two of a first time of receipt, a first sender name, a first domain name, a first message sentiment, and a first attachment file associated with the at least one training communication.

3. The system of claim 2, wherein determining that the first domain is the first phishing domain comprises:
extracting a second set of features from a live communication from the second set of communications, wherein the second set of features comprises at least one of a second time of receipt, a second sender name, a second domain name, a second message sentiment, and a second attachment file associated with the live communication;
for at least one feature from the second set of features:
comparing the feature with a counterpart feature from the first set of features; and
determining whether the feature corresponds with the counterpart feature;
determining whether more than a threshold percentage of features from the second set of features corresponds with counterpart features from the first set of features; and
in response to determining that more than the threshold percentage of features from the second set of features corresponds with the counterpart features from the first set of features, determining that the live communication is associated with the first phishing domain.

4. The system of claim 3, wherein determining that the live communication is associated with the first phishing domain comprises determining one or more phishing domain indicators from the first set of features, the one or more phishing domain indicators comprise:
the second time of receipt is not within operation hours of a target domain that the particular phishing domain is attempting to impersonate;
the first domain contains at least one of a digit and a symbol indicating that the first domain is a parity of the target domain;
the second message sentiment indicates a sense of urgency;
a network traffic associated with the first domain is below a threshold percentage; and
an Internet Protocol (IP) address associated with the first domain does not belong to a country of origin of the first domain.

5. The system of claim 3, wherein:
the first set of features is represented by a first vector comprising a first set of numerical values; and
the second set of features is represented by a second vector comprising a second set of numerical values.

6. The system of claim 5, wherein comparing the feature from the second set of features with the counterpart feature from the first set of features comprises:
determining a first numerical value representing the feature from the first vector;
determining a second numerical value representing the counterpart feature from the second vector; and
comparing the first numerical value with the second numerical value.

7. The system of claim 6, wherein determining whether the feature from the second set of features corresponds with the counterpart feature from the first set of features comprises:
  determining whether the second numerical value matches the first numerical value; and
  in response to determining that the second numerical value matches the first numerical value, determining that the feature corresponds with the counterpart feature.

8. A method for preventing communications from phishing domains, comprising:
  receiving a first set of communications comprising at least one email message, wherein the first set of communications is associated with a first domain;
  determining that the first domain is a first phishing domain, wherein the first phishing domain corresponds to a first variation of a phishing domain target;
  in response to determining that the first domain is the first phishing domain, registering the first phishing domain in a Domain Name System (DNS) server, such that the first set of communications is blocked by a firewall configuration to be received at computing devices operably coupled with the DNS server;
  predicting a domain style pattern that corresponds to at least one variation of the phishing domain target;
  in response to predicting the domain style pattern that corresponds to at least one variation of the phishing domain target, executing a query to identify a second domain that follows the predicted domain style pattern and is not registered as a phishing domain;
  receiving a second set of communications comprising at least one email message, wherein the second set of communications is associated with a second domain;
  determining a phishing domain indicator associated with the second domain, wherein the phishing domain indicator comprises a calendar date associated with the second set of communications being within a threshold interval of an operating period associated with the phishing domain target;
  determining that the second domain is a second phishing domain based at least in part upon the phishing domain indicator; and
  in response to determining that the second domain is the second phishing domain:
    registering the second phishing domain in the DNS server to re-route the second set of communications to a particular server to monitor the second set of communications to determine phishing activities implemented in the second set of communications over time, wherein the phishing activities comprise attempting to obtain login credentials associated with receivers of the second set of communications; and
    forwarding the second set of communications for investigation.

9. The method of claim 8, further comprising storing a training dataset comprising a plurality of received communications, wherein:
  at least one training communication from the plurality of received communications comprises a text message or an email message and is known to be associated with a particular phishing domain; and
  the at least one training communication is associated with a first set of features comprising at least two of a first time of receipt, a first sender name, a first domain name, a first message sentiment, and a first attachment file associated with the at least one training communication.

10. The method of claim 9, wherein determining that the first domain is the first phishing domain comprises:
  extracting a second set of features from a live communication from the second set of communications, wherein the second set of features comprises at least one of a second time of receipt, a second sender name, a second domain name, a second message sentiment, and a second attachment file associated with the live communication;
  for at least one feature from the second set of features:
    comparing the feature with a counterpart feature from the first set of features; and
    determining whether the feature corresponds with the counterpart feature;
  determining whether more than a threshold percentage of features from the second set of features corresponds with counterpart features from the first set of features; and
  in response to determining that more than the threshold percentage of features from the second set of features corresponds with the counterpart features from the first set of features, determining that the live communication is associated with the first phishing domain.

11. The method of claim 10, wherein determining that the live communication is associated with the first phishing domain comprises determining one or more phishing domain indicators from the first set of features, the one or more phishing domain indicators comprise:
  the second time of receipt is not within operation hours of a target domain that the particular phishing domain is attempting to impersonate;
  the first domain contains at least one of a digit and a symbol indicating that the first domain is a parity of the target domain;
  the second message sentiment indicates a sense of urgency;
  a network traffic associated with the first domain is below a threshold percentage; and
  an Internet Protocol (IP) address associated with the first domain does not belong to a country of origin of the first domain.

12. The method of claim 10, wherein:
  the first set of features is represented by a first vector comprising a first set of numerical values; and
  the second set of features is represented by a second vector comprising a second set of numerical values.

13. The method of claim 12, wherein comparing the feature from the second set of features with the counterpart feature from the first set of features comprises:
  determining a first numerical value representing the feature from the first vector;
  determining a second numerical value representing the counterpart feature from the second vector; and
  comparing the first numerical value with the second numerical value.

14. The method of claim 13, wherein determining whether the feature from the second set of features corresponds with the counterpart feature from the first set of features comprises:
  determining whether the second numerical value matches the first numerical value; and in response to determining that the second numerical value matches the first numerical value, determining that the feature corresponds with the counterpart feature.

15. A non-transitory computer-readable medium storing instructions that when executed by a processor cause the processor to:
    receive a first set of communications comprising at least one email message, wherein the first set of communications is associated with a first domain;
    determine that the first domain is a first phishing domain, wherein the first phishing domain corresponds to a first variation of a phishing domain target;
    in response to determining that the first domain is the first phishing domain, register the first phishing domain in a Domain Name System (DNS) server, such that the first set of communications is blocked by a firewall configuration to be received at computing devices operably coupled with the DNS server;
    predict a domain style pattern that corresponds to at least one variation of the phishing domain target;
    in response to predicting the domain style pattern that corresponds to at least one variation of the phishing domain target, execute a query to identify a second domain that follows the predicted domain style pattern and is not registered as a phishing domain;
    receive a second set of communications comprising at least one email message, wherein the second set of communications is associated with a second domain;
    determine a phishing domain indicator associated with the second domain, wherein the phishing domain indicator comprises a calendar date associated with the second set of communications being within a threshold interval of an operating period associated with the phishing domain target;
    determine that the second domain is a second phishing domain based at least in part upon the phishing domain indicator; and
    in response to determining that the second domain is the second phishing domain:
        register the second phishing domain in the DNS server to re-route the second set of communications to a particular server to monitor the second set of communications to determine phishing activities implemented in the second set of communications over time, wherein the phishing activities comprise attempting to obtain login credentials associated with receivers of the second set of communications; and
        forward the second set of communications for investigation.

16. The non-transitory computer-readable medium of claim 15, wherein the instructions further cause the processor to access a training dataset comprising a plurality of received communications, wherein:
    at least one training communication from the plurality of received communications comprises a text message or an email message and is known to be associated with a particular phishing domain; and
    the at least one training communication is associated with a first set of features comprising at least two of a first time of receipt, a first sender name, a first domain name, a first message sentiment, and a first attachment file associated with the at least one training communication.

17. The non-transitory computer-readable medium of claim 16, wherein determining that the first domain is the first phishing domain comprises:
    extracting a second set of features from a live communication from the second set of communications, wherein the second set of features comprises at least one of a second time of receipt, a second sender name, a second domain name, a second message sentiment, and a second attachment file associated with the live communication;
    for at least one feature from the second set of features:
        comparing the feature with a counterpart feature from the first set of features; and
        determining whether the feature corresponds with the counterpart feature;
    determining whether more than a threshold percentage of features from the second set of features corresponds with counterpart features from the first set of features; and
    in response to determining that more than the threshold percentage of features from the second set of features corresponds with the counterpart features from the first set of features, determining that the live communication is associated with the first phishing domain.

18. The non-transitory computer-readable medium of claim 17, wherein determining that the live communication is associated with the first phishing domain comprises determining one or more phishing domain indicators from the second set of features, wherein the one or more phishing domain indicators indicate:
    the second time of receipt is not within operation hours of a target domain that the particular phishing domain is attempting to impersonate;
    the first domain contains at least one of a digit and a symbol indicating that the first domain is a parity of the target domain;
    the second message sentiment indicates a sense of urgency;
    a network traffic associated with the first domain is below a threshold percentage; or
    an Internet Protocol (IP) address associated with the first domain does not belong to a country of origin of the first domain.

19. The non-transitory computer-readable medium of claim 17, wherein:
    the first set of features is represented by a first vector comprising a first set of numerical values; and
    the second set of features is represented by a second vector comprising a second set of numerical values.

20. The non-transitory computer-readable medium of claim 19, wherein comparing the feature from the second set of features with the counterpart feature from the first set of features comprises:
    determining a first numerical value representing the feature from the first vector;
    determining a second numerical value representing the counterpart feature from the second vector; and
    comparing the first numerical value with the second numerical value.

* * * * *